United States Patent
Koo et al.

(10) Patent No.: US 7,161,924 B2
(45) Date of Patent: Jan. 9, 2007

(54) DEVICE AND METHOD FOR TRANSMITTING MULTIMEDIA DATA IN MOBILE COMMUNICATION SYSTEM

(75) Inventors: Chang-Hoi Koo, Songnam-shi (KR); Min-Goo Kim, Suwon-shi (KR); Dae-Gyun Kim, Songnam-shi (KR); Dong-Seek Park, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 729 days.

(21) Appl. No.: 10/007,185

(22) Filed: Oct. 19, 2001

(65) Prior Publication Data

US 2002/0080737 A1   Jun. 27, 2002

(30) Foreign Application Priority Data

Oct. 19, 2000  (KR) ............................... 2000-61721
Oct. 20, 2000  (KR) ............................... 2000-61911
Oct. 20, 2000  (KR) ............................... 2000-61914

(51) Int. Cl.
*H04Q 7/24* (2006.01)
*H04J 3/16* (2006.01)
*H04J 3/22* (2006.01)

(52) U.S. Cl. ...................................... 370/338; 370/469
(58) Field of Classification Search ..................... None
See application file for complete search history.

(56) References Cited

U.S. PATENT DOCUMENTS 5,425,029 A * 6/1995 Hluchyj et al. .......... 370/395.6
5,657,325 A * 8/1997 Lou et al. .................... 370/334
5,966,377 A * 10/1999 Murai ......................... 370/342
6,351,460 B1 * 2/2002 Tiedemann et al. ......... 370/332
6,477,670 B1 * 11/2002 Ahmadvand ................. 714/712
6,711,182 B1 * 3/2004 Gibbs et al. ................. 370/537
6,788,657 B1 * 9/2004 Freiberg et al. ............. 370/328
7,068,627 B1 * 6/2006 Koo et al. .................... 370/333

FOREIGN PATENT DOCUMENTS

EP        1 030 484       8/2000
WO     WO 99/66736      12/1999
WO     WO 00/22693       4/2000

OTHER PUBLICATIONS

Chinese Office Action dated Jul. 25, 2003 issued in a counterpart application, namely, Appl. No. 01803570.1.

* cited by examiner

*Primary Examiner*—Chau Nguyen
*Assistant Examiner*—Cynthia L. Davis
(74) *Attorney, Agent, or Firm*—The Farrell Law Firm

(57) ABSTRACT

There is provided a novel architecture for transmitting multimedia data with different QoSs in a mobile communication system. In a protocol structure according to the present invention, an RLP layer receives data with different QoSs and dividing the data into datagrams according to the QoSs, a MUX layer multiplexes the datagrams received from the RLP layer and outputs multiplexed TU data, and a QCCH receives the multiplexed TU data and outputs TU blocks with the QoS by puncturing and repeating information added according to the QoS for the multiplexed TU data.

23 Claims, 11 Drawing Sheets

DEVICE AND METHOD FOR TRANSMITTING MULTIMEDIA DATA IN MOBILE COMMUNICATION SYSTEM

PRIORITY

This application claims priority to an application entitled "Device and Method for Transmitting Multimedia Data in Mobile Communication System" filed in the Korean Industrial Property Office on Oct. 19, 2000 and assigned Serial No. 2000-61721, an application entitled "Device and Method for Transmitting Multimedia Data in Mobile Communication System" filed in the Korean Industrial Property Office on Oct. 20, 2000 and assigned Serial No. 2000-61911, an application entitled "Device and Method for Transmitting Multimedia Data in Mobile Communication System" filed in the Korean Industrial Property Office on Oct. 20, 2000 and assigned Serial No. 2000-61914, the contents of all of which are hereby incorporated by reference.

BACKGROUND OF THE INVENTION

1. Field of the Invention

The present invention relates generally to a data service providing device and method in a mobile communication system, and in particular, to a device and method for providing a data service with different QoSs (Qualities of Service) in a mobile communication system.

2. Description of the Related Art

Various technics have been proposed for IS-2000 to provide a data service in mobile communication systems. Those mobile communication systems should transmit high rate data with a high throughput in many cases. The operations of layers including the RLP (Radio Link Protocol) layer, the MUX (Multiplexing) layer, and the physical layer are very crucial to radio protocols to offer a high throughput. Also, interface matching must be provided between the layers and an information flow based on the interface matching becomes a significant factor to increasing the throughput.

Meanwhile, since data transmitted on the same physical channel has the same QoS level, when different media data types are transmitted, a different QoS cannot be provided for each media data type. Thus, it can be said that the mobile communication systems are not suitable for multimedia service.

In the case of an HDR system, for example, the system transmits/receives multiple inputs. Because the HDR system has been developed basically for non-real time service, it has defined physical layer, scheduling, signaling, etc. to provide a non-real time data service at a high data rate to users within a cell. If a variety of services such as an Internet data service, a voice service and a multimedia service are to be provided concurrently, the HDR system has limitations in processing and transmitting data according to the different QoSs of the services.

SUMMARY OF THE INVENTION

An object of the present invention is, therefore, to provide a device and method for implementing protocols by which a multimedia service with different QoSs can be provided in a mobile communication system.

Another object of the present invention is to provide a device and method for providing a multimedia data service with different QoSs with a high throughput in a mobile communication system.

Another object of the present invention is also to provide a device and method for mapping transport units (TUs) in a MUX layer in an apparatus that provides a multimedia data service with different QoSs in a mobile communication system.

A further object of the present invention to discriminately provide a device and method for transmitting data in an apparatus that provides a multimedia data service with different QoSs in a mobile communication system.

Still another object of the present invention is to provide a device and method for mapping data according different QoS requirements in an apparatus that provides a multimedia data service with different QoSs in a mobile communication system.

Yet another object of the present invention is to provide a logical channel device and method for a transmitter that transmits multimedia data with different QoSs in a mobile communication system.

Yet another object of the present invention is also to provide a device and method for transmitting data according to their QoSs in an apparatus that transmits multimedia data with different QoSs in a mobile communication system.

The foregoing and other objects of the present invention can be achieved by providing a novel architecture for transmitting multimedia data with different QoSs in a mobile communication system. In a protocol structure according to the present invention, an RLP layer receives data with different QoSs and divides the data into datagrams according to the QoSs, a MUX layer multiplexes the datagrams received from the RLP layer and outputs multiplexed data in a transmission unit, and a QCCH receives the multiplexed TU data and outputs TU blocks with the QoS by puncturing and repeating information added according to the QoSs for the multiplexed TU data.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described hereinbelow with reference to the accompanying drawings. In the following description, well-known functions or constructions are not described in detail since they would obscure the invention in unnecessary detail.

Figure 1:
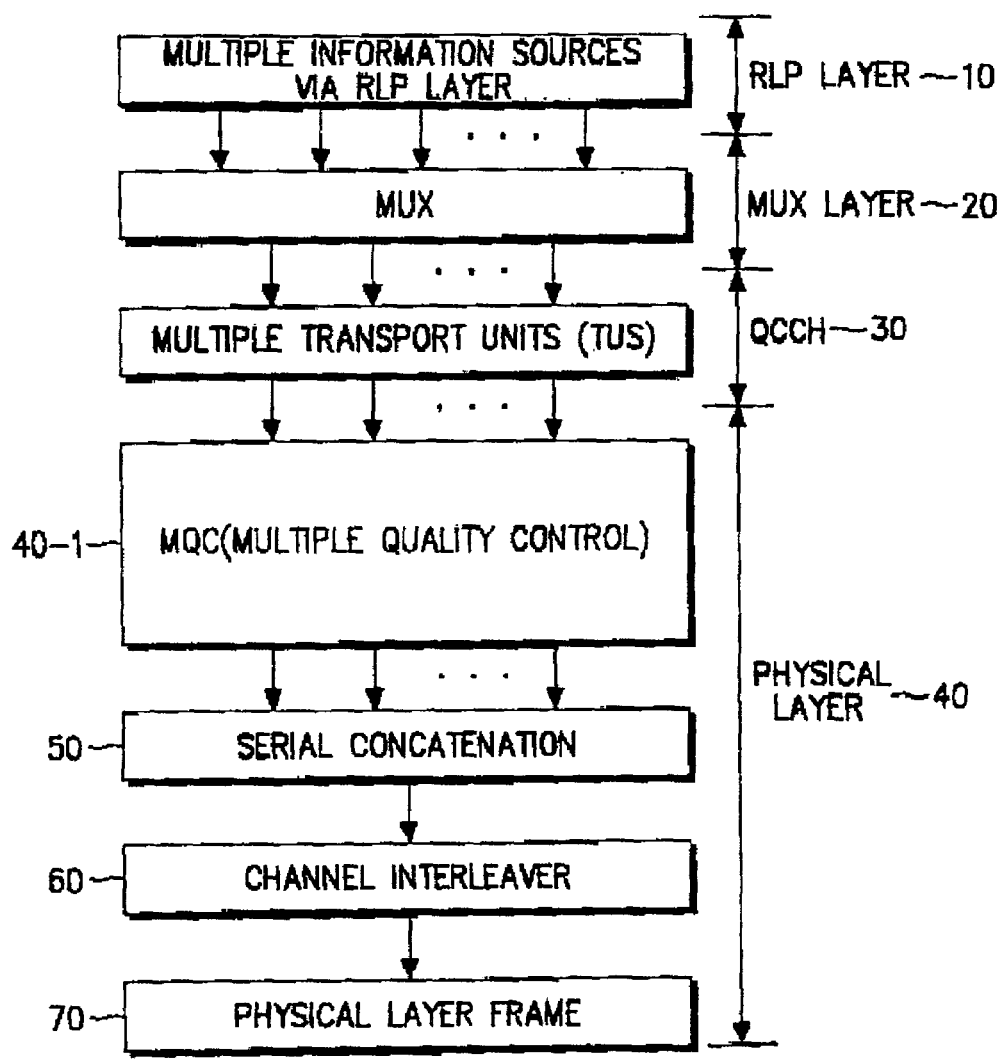
FIG. 1 is a block diagram of a protocol structure for application to a device for transmitting multimedia data with different QoSs according to an embodiment of the present invention.

FIG. 1 is a block diagram illustrating a protocol structure for application to a device for transmitting multimedia data with different QoSs according to an embodiment of the present invention.

Referring to FIG. 1, the protocol structure is composed of an RLP layer 10, a MUX layer 20, and a physical layer having an MQC (Multiple Quality Control) 40, and interfacing function blocks 50, 60 and 70.

The protocol structure is designed to provide different QoSs to transmission data via QCCHs (Quality Control Channels) 30. This protocol structure represents a general user plane for transmission of pure user information that is, no control information is transmit. From a control plane's perspective, logical channels proposed according to the present invention are mapped to specific control channels and the QCCHs 30 are mapped on a 1:1 basis to logical channels. The description of the present invention will be confined to the user plane, while each function block is still applicable to the control plane.

The RLP layer 10 processes logical channels that are determined according to the classes of application service streams. That is, the RLP layer can constitute a plurality of logical channels according to the classes of application services, for example, voice service, moving picture service, or Internet data service. Also, the RLP layer 10 determines the number of RLP instances according to the types of input data and the number of the logical channels, and produces as many RLP instances as the determined number. The relationship between an RLP instance and services can be defined in three ways: one RLP instance can be constituted to accommodate one service only; one RLP instance can accommodate a plurality of same-type services; or, one RLP instance can accommodate a plurality of services irrespective of service types. When an independent RLP instance is assigned to each service, the number of RLP instances generated is equal to the number of classified logical channels. Here, an RLP controls management of the sequence number of data transmitted on each logical channel and data segmentation. On the other hand, when one RLP manages a plurality of logical channels, a different RLP function is required because the logical channels must be managed not individually but collectively.

In the embodiment of the present invention, an independent RLP is provided for each logical channel, by way of example.

It is assumed herein that a datagrams is determined for transmission data on a logical channel according to the source data rate of the application service. The length of the datagrams can be less than or equal to a TU(Transport Unit) length for a QCCH 30 in length. The RLP also transmits information about the type of the transmission data on the logical channel. The resulting data is transmitted to the MUX layer 20.

The MUX layer 20 functions to map between the logical channels and the QCCHs 30. The datagram received on the logical channels in the MUX layer 20 are processed as follows for mapping to the QCCHs 30.

(1) Multiplexing functionality. If the length of the datagram received on a logical channel is less than the TU length for the QCCHs 30, the datagram is assembled with datagram received on another logical channel to build a data unit of a fixed length.

(2) Switching functionality. If the length of the datagram received on a logical channel is equal to the TU length for the QCCHs 30, the datagram is switched without assembly with another logical channel datagram to a particular QCCH 30. Another function of the switching is to map the datagram of logical channels with the same or similar QoSs to a QCCH 30 with a particular QoS, so that the datagram received on the logical channels can be appropriately distributed to always activate the QCCHs 30.

(3) QoS control functionality. The datagram received on a logical channel is mapped to a QCCH 30 according to its priority, which can be determined according to the characteristics of the logical channel. The QoS control functionality applies to the case where control information is transmitted along with data information, or signaling information containing system information is transmitted with other data information.

Datagram generated from the RLP layer 10 is transmitted on a QCCH 30 to the MQC 40 via the MUX layer 20. A plurality of QCCHs 30 may exist. Therefore, a different QoS can be ensured for each QCCH 30 according to an internal function block in the MQC 40. A TU on a QCCH 30 can be different in length depending on whether it is transmitted in a forward or reverse direction. The TU length can be fixed or variable regardless of a forward or reverse direction. Or, the TU length can have a fixed length for the forward direction and a variable length for the reverse direction, or vice versa. The number of TUs can be different for the forward direction and the reverse direction. These parameters are system implementation-dependent or service convenience-dependent.

Each function block in the MQC 40 provides a different control to a TU with a different QoS mapped via the MUX layer 20 according to the QoS. A quality (or QoS) matcher (QM) in the MQC 40 assigns a different value to each TU according to its effective QoS. The assigned value determines the QoS of the QCCH 30. If a fixed QM value is used, TUs transmitted on the same QCCH 30 have the same QoS. If a dynamic QM value is used, different QoSs can be applied to a QCCH 30. The MQC 40 provides a different QoS to each data received on the QCCH 30, which will be later described referring to FIG. 2.

A serial concatenator 50 serially concatenates TUs with different QoSs received on a plurality of QCCHs 30. The serial concatenator 50 matches the TUs to an interleaver size by constructing a physical layer packet (PLP) of the interleaver size with the TUs.

A channel interleaver 60 interleaves the serially concatenated TUs for transmission on a physical channel. The channel interleaver 60 performs symbol pruning in addition to the interleaving function provided by a typical mobile communication system. The channel interleaver 60 prunes TUs if the total size of the serially concatenated TUs exceeds an acceptable size. The resulting physical layer frame 70 is mapped to slots as shown in FIG. 2 prior to transmission to a receiver.

Figure 2:
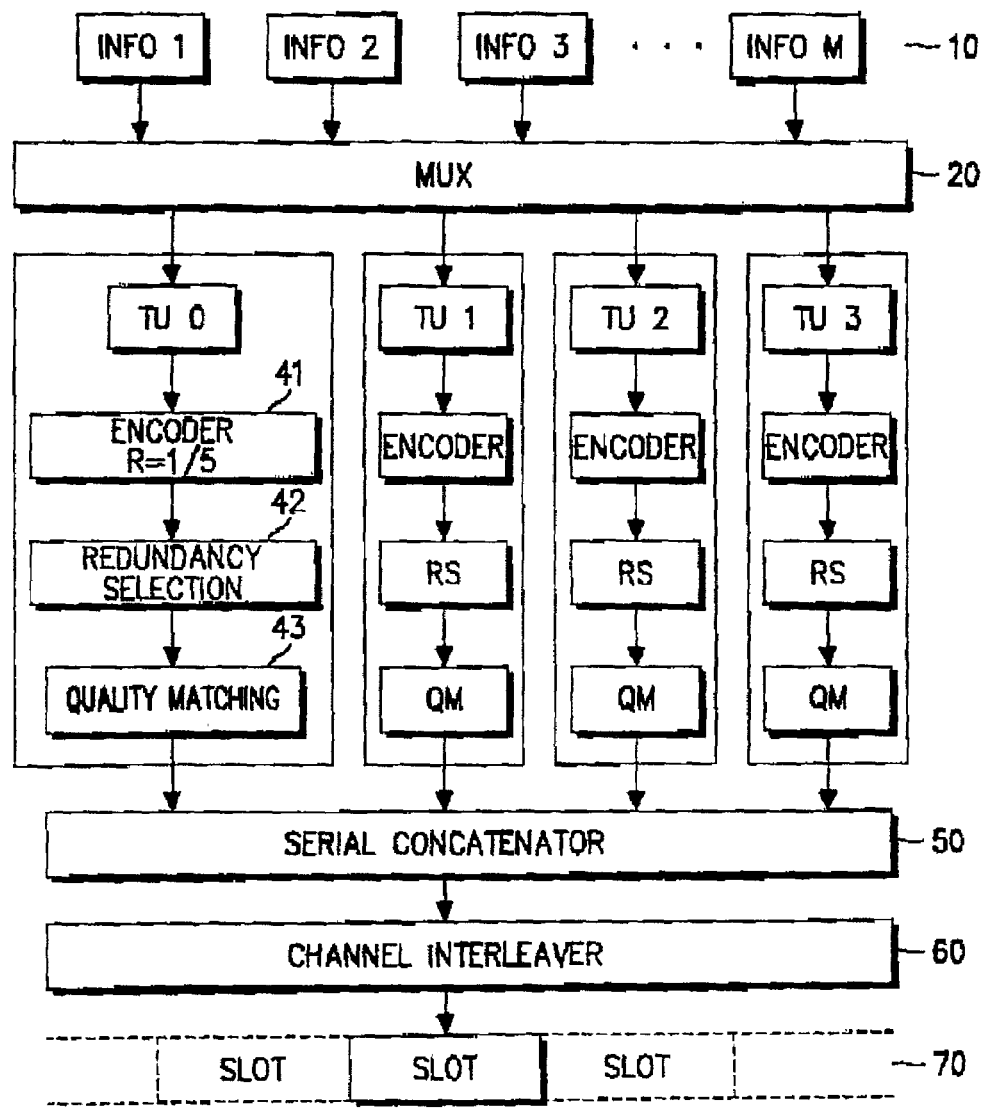
FIG. 2 is a detailed block diagram shown in FIG. 1.

FIG. 2 is a detailed block diagram shown in FIG. 1.

The MUX layer 20 receives datagram (info 1, info 2, info 3, . . . , info M) from the RLP layer 10 and processes the received datagram based on the QoS requirements of their application services according to the above-described functionalities. As stated before, one RLP layer 10 can provide an independent control for each datagram class info 1, info 2, info 3, . . . , info M, or can provide overall control to the data stream.

The MUX layer 20 outputs each TU (in this case TU0, TU1, TU2, and TU3) with a CRC . The length of the CRC is determined by the length or characteristics of the TU. Especially when no data is generated from the MUX layer 20, a CRC itself can serve as one TU. The CRC attached to each TU can be used as a retransmission unit according to a transmission scheme, that is, ARQ (Automatic Repeat Request) in a lower layer. A detailed description of a TU-basis retransmission and ARQ will be avoided here as it will become apparent to those skilled in the art.

Encoders 41 receive TUs on different QCCHs 30. The encoders 41 are turbo encoders or convolutional encoders, for example. In FIG. 2, turbo encoders are used for illustrative purposes. Each encoder 41 encodes an input TU with a code rate which can be different for each different TU. Alternatively, the same code rate can be applied to all the TUs received on the QCCHs 30. In the case of retransmission by HARQ (Hybrid ARQ), an initial code rate can be different from a code rate for retransmission of data that contains errors. In the embodiment of the present invention, the code rate of the turbo encoders 41 is 1/5 applied to all TUs.

A redundancy selector (RS) 42 carries out redundancy selection, which is a link transmission scheme useful to HARQ Type II/III. That is, a different redundancy matrix (i.e., a different complementary code) is used for retransmission to increase the combining performance of a receiver. Retransmission is available on a TU basis in the present invention.

The QM 43 provides a different QoS to each TU by controlling a required QoS matching value (QM value) through puncturing and repetition.

The QM value can be fixed when a channel is established between a base station and a mobile station, if the channel is static. On the other hand, if a channel is dynamically set up, the QM value is variable and reported to the receiver on a control channel each time a TU is transmitted. The QM value is relative between the QCCHs 30 irrespective of whether it is fixed or variable. Therefore, the QM value is a significant parameter by which a different QoS is set for each QCCH 30 according to the characteristics of its application service. The TUs output from the QM 43 assume different characteristics and formats from when they are input to the QCCHs 30.

The serial concatenator 50 serially concatenates the TUs received from the QM 43. The serially concatenated TUs are then channel-interleaved in the channel interleaver 60, and are mapped to transmission slots of a physical channel and transmitted to the receiver. The number of TUs per slot on the physical channel is determined according to the data rate of the physical channel.

Figure 3:
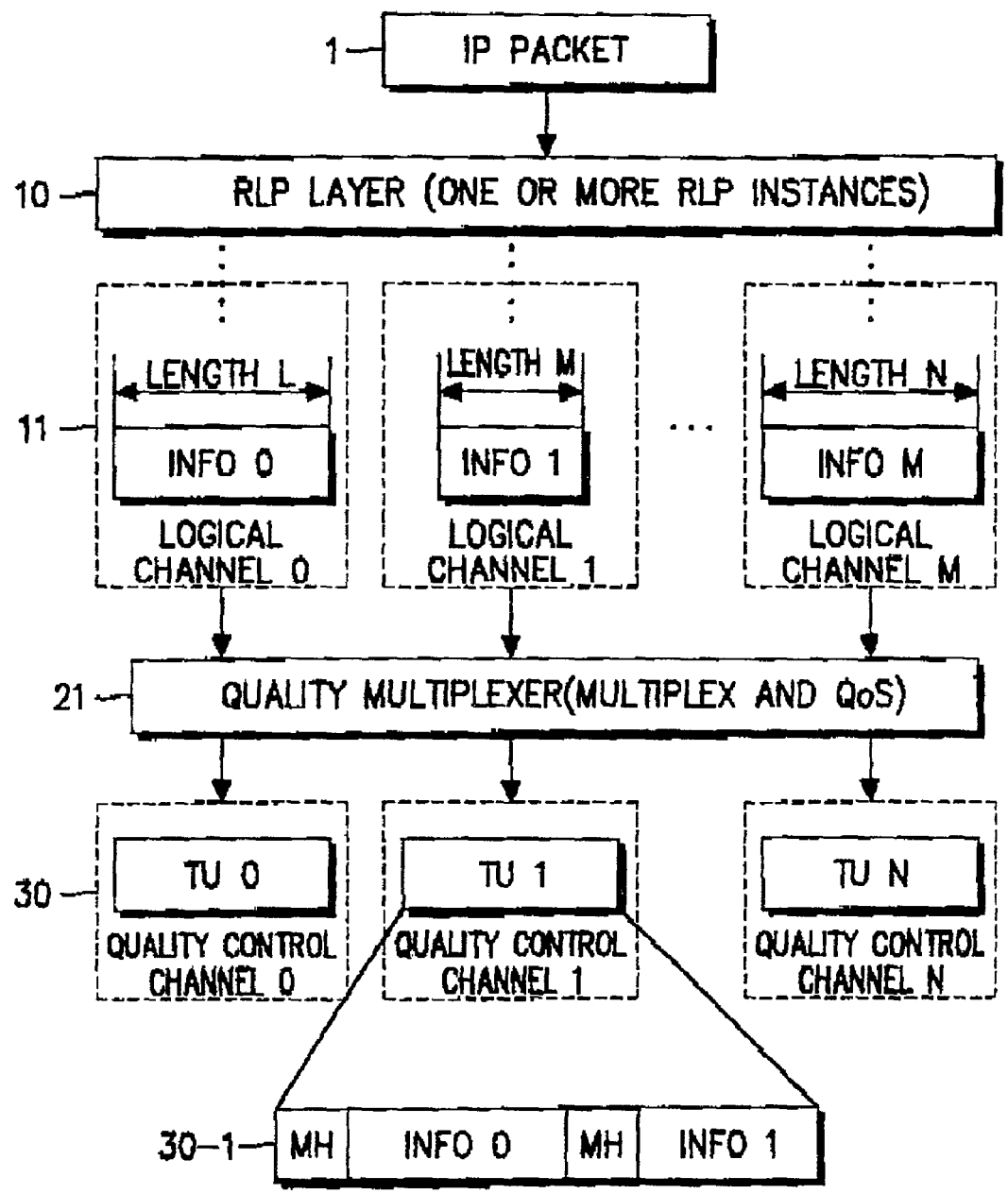
FIG. 3 is a block diagram illustrating an embodiment of data processing in the RLP layer and the MUX layer shown in FIG. 1.

FIG. 3 illustrates an embodiment of data processing in the RLP layer 10 and the MUX layer 20 according to the present invention.

In FIG. 3, an IP packet 1 represents transmission data. The RLP layer 10 divides the IP packet 1 into datagrams of a transmittable size. A transmittable size means the amount of data that can be processed in each logical channel 11.

The datagrams are transmitted on logical channels 11. Since a different data rate is set according to a source data rate, the length of each datagram can be different as shown in FIG. 3. The data Info 0, Info 1, . . . , Info M are datagrams for the respective logical channels 11. The size of each datagram is less than or equal to the length of a TU transmitted on a QCCH 30. The number of the logical channels 11 can be determined according to the characteristics or classes of application services. As stated before, as many RLP instances as the logical channels 11 are generated to control the logical channels 11, or one RLP controls the logical channels 11.

The datagram unit is of a fixed or variable length and the number of the logical channels 11 is determined according to the QoSs or application service characteristics of the IP packet 1 and the data rates. As the transmission packet is comprised of data with an increase of different classes or an increase of different QoS requirements, the number of logical channels increases. The datagrams should be labeled with different sequence numbers to allow the receiver to reassemble the datagrams in their generated order from the higher application services or re-receive data. Hence, assignment and management of the sequence numbers is a very important function in the RLP layer 10. In the case where a single RLP instance manages a plurality of logical channels 11, the datagrams on the logical channels 11 are generated from the one RLP instance. Therefore, sequence numbers are assigned to the datagrams in the same method. In other words, the datagrams transmitted on the logical channel 11 are numbered in a mutually dependent way. A detailed description of the sequence numbers will be given later with reference to FIG. 7 and FIG. 8.

For the input of the datagrams received from the single RLP instance on a plurality of logical channels 11, a quality multiplexer (Multiplex and QoS) 21, included in the MUX layer 20, multiplexes the datagrams and maps the multiplexed datagrams to a plurality of QCCHs 30. Each QCCH 30 transmits data on a TU basis. After a CRC is added to each TU, the TUs are converted in the form of radio packet data in the physical layer frame 70 via the function blocks of the lower layer (the physical layer-the MQC 40 to the channel interleaver 60).

The quality MUX 21 in the MUX layer 30 switches and multiplexes the datagrams Info 0, Info 1, . . . , Info M received on the logical channels. If an input datagram is less than a TU, the quality MUX 21 assembles datagrams to build one TU.

The TUs are transmitted on the QCCHs 30. Therefore, a TU on each CCH 30 is a datagram that has passed the MUX layer 20.

Reference numeral 30-1 denotes the data contents of a TU. The two datagrams Info 0 and Info 1 shorter than a TU are assembled into one TU. That is, one TU may have one datagram, or more than one datagram. Since the TU 30-1 includes two datagrams in combination, the quality MUX 21 adds information (i.e., multiplexing header: MH) to identify each datagram. One MH precedes each datagram. If three datagrams shorter than the TU form one TU, three MHs are inserted. The MH contains control information such as the length of a corresponding datagram transmitted from the RLP.

As described above, a TU can have a fixed length or a variable length. If the TU is variable in length, a plurality of datagrams transmitted on different logical channels can be assembled into one TU. On the other hand, if the TU is fixed in length, the length of each component datagram must be less than that of the TU. In the case where the length of the assembled datagrams is less than that of the TU, a padding can be added to the TU to obtain the fixed length. Here, the logical channels that are assembled have the same QoS or similar QoSs. Therefore, when the datagrams of the assembled logical channels, that is, different logical channels, are transmitted on the same QCCH 30, they have the same QoS.

Figure 4:
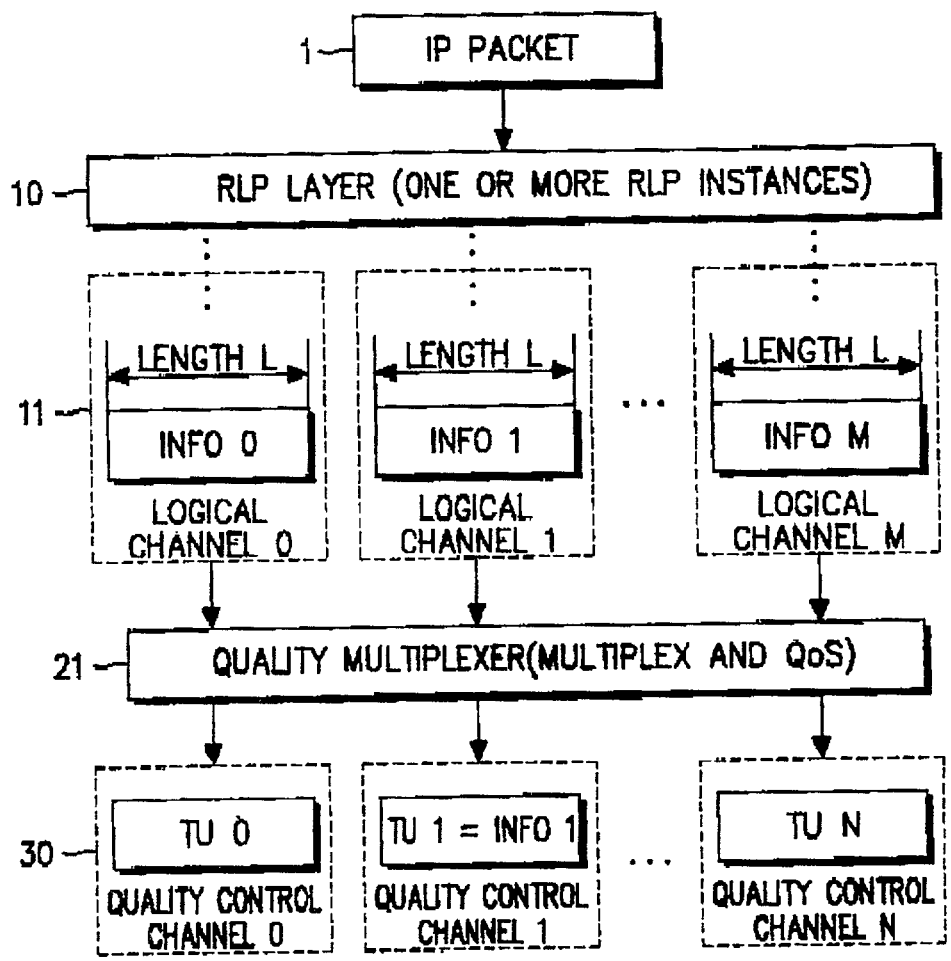
FIG. 4 is a block diagram illustrating another embodiment of data processing in the RLP layer and the MUX layer in FIG. 1.

FIG. 4 illustrates another embodiment of data processing in the RLP layer 10 and the MUX layer 20 according to the present invention, referred to for describing formation of TUs out of datagrams received on the logical channels according to the characteristics of the datagrams in the MUX layer 20.

The RLP layer 10 divides the IP packet 1 into datagrams of a suitable size. The datagrams Info 0 to Info M are transmitted on the logical channels 11. The number of the logical channels 11 is determined according to the characteristics or classes of the application services. One RLP instance or as many RLP instances as the logical channels 11 are generated to control the logical channels 11. Interfacing between the RLP instance and the logical channels will be described below.

As stated before, the datagram is shorter than or as long as the TU for a QCCH 30. Specifically, FIG. 4 illustrates the operation of the MUX layer 20 when the datagram is as long as the TU, as compared to FIG. 3.

The quality MUX 21 multiplexes the datagrams Info 0 to Info M received on the logical channels 11. Since a datagram and a TU are the same size, the quality MUX 21 performs a switching function to map the datagrams to QCCHs 30, without datagram assembly. More logical channels 11 than the QCCHs 30 are input to the quality MUX 21, and thus the quality MUX 21 must switch two or more logical channels to one QCCH 30. As a result, each QCCH has data with a different QoS. For example, QCCH #1 is assigned to the best QoS, QCCH #2 to the second best QoS, and QCCH #N to the lowest QoS. Thus, the quality MUX 21 assembles logical channels with the same QoS or similar QoSs by switching.

If the datagrams Info 0 and Info 1 are transmitted on logical channels 11 with the same or similar QoS requirements, they are switched to the same QCCH 30. More specifically, if the datagrams Info 0 and Info 1 are transmitted on logical channels 11 requiring the best QoS, they are switched to QCCH #0. Switching is carried out basically in time division and so different time indexes are assigned to the datagrams Info 0 and Info 1.

The datagrams transmitted on the logical channels are converted to TUs at the output of the quality MUX 21. As seen from the above example where the datagrams Info 0 and Info 1 with the best QoS requirement are transmitted on QCCH #0, the datagrams on different logical channels are transmitted on the same QCCH with the same QoS. Since the quality MUX 21 maps logical channels according to the states of the QCCHs 30, a plurality of logical channels can be mapped to an unspecified QCCH 30.

Figure 5:
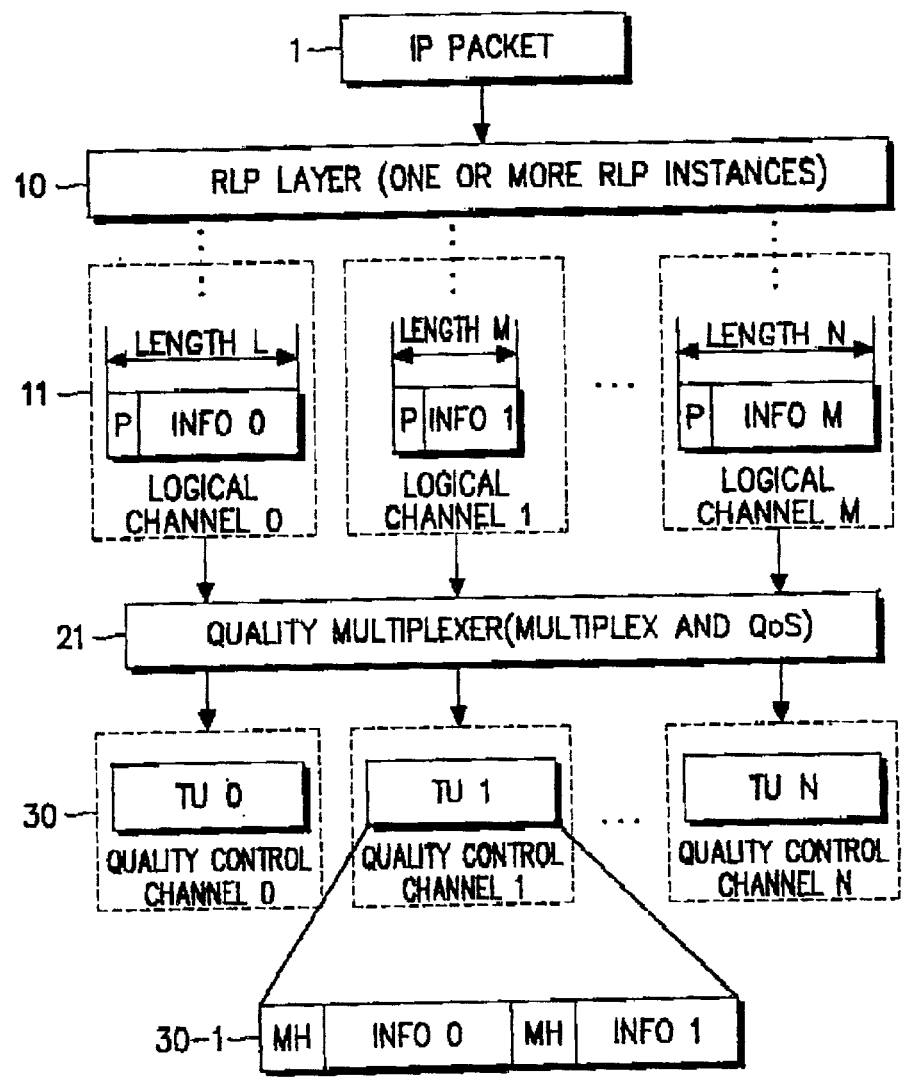
FIG. 5 is a block diagram illustrating a data flow when priority is involved in multiplexing shown in FIG. 3.

FIG. 5 illustrates a data flow when priority is involved in multiplexing shown in FIG. 3.

The procedure shown in FIG. 5 is the same as that of FIG. 3 except for a data transmission process. The datagram on each logical channel 11 has a priority field, P. The length of the priority field is determined according to the number of intended priority levels. In general, eight priority levels are defined and thus a three-bit priority field is needed. However, there is no particular limit placed on the number of priority levels. If the priority field includes N bits, $2^N$ priority levels are given. A priority level is given to a datagram according to its characteristics. In general, a control signal has priority over a user information signal. The priority is used in the sense of a transmission priority. When two or more datagrams with different priority levels are generated concurrently, the transmission order is determined according to their priority levels. On the assumption that three datagrams Info 0, Info 1 and Info 2 with the highest priority, the middle priority, and the lowest priority, respectively, are generated and one QCCH is set up, the quality MUX 21 transmits the datagrams in the order of Info 0, Info 1, and Info 2 on the QCCH 30 according to their priority levels as shown in FIG. 5.

On the other hand, if two or more QCCHs 30 are set up, the quality MUX 21 distributes the datagrams appropriately. When datagrams with the same 30 priority level are generated, the quality MUX 21 first transmits the earlier input datagram according to the time division principle. However, if the datagrams are generated concurrently, the logical channels 11 are mapped to the QCCHs 30 by scheduling such as a round robin method in the quality MUX 21.

In the case where the datagrams Info 0 and Info 1 have the same priority level and are shorter than a given TU length, they are multiplexed and mapped to one TU. While datagrams with different priority levels can be assembled to one TU, datagrams with the same priority level are basically assembled to one TU and if assembly is impossible in view of priority levels, datagrams can be mapped to different TUs. Therefore, the quality MUX 21 must assemble datagrams appropriately according to their priority levels.

Figure 6:
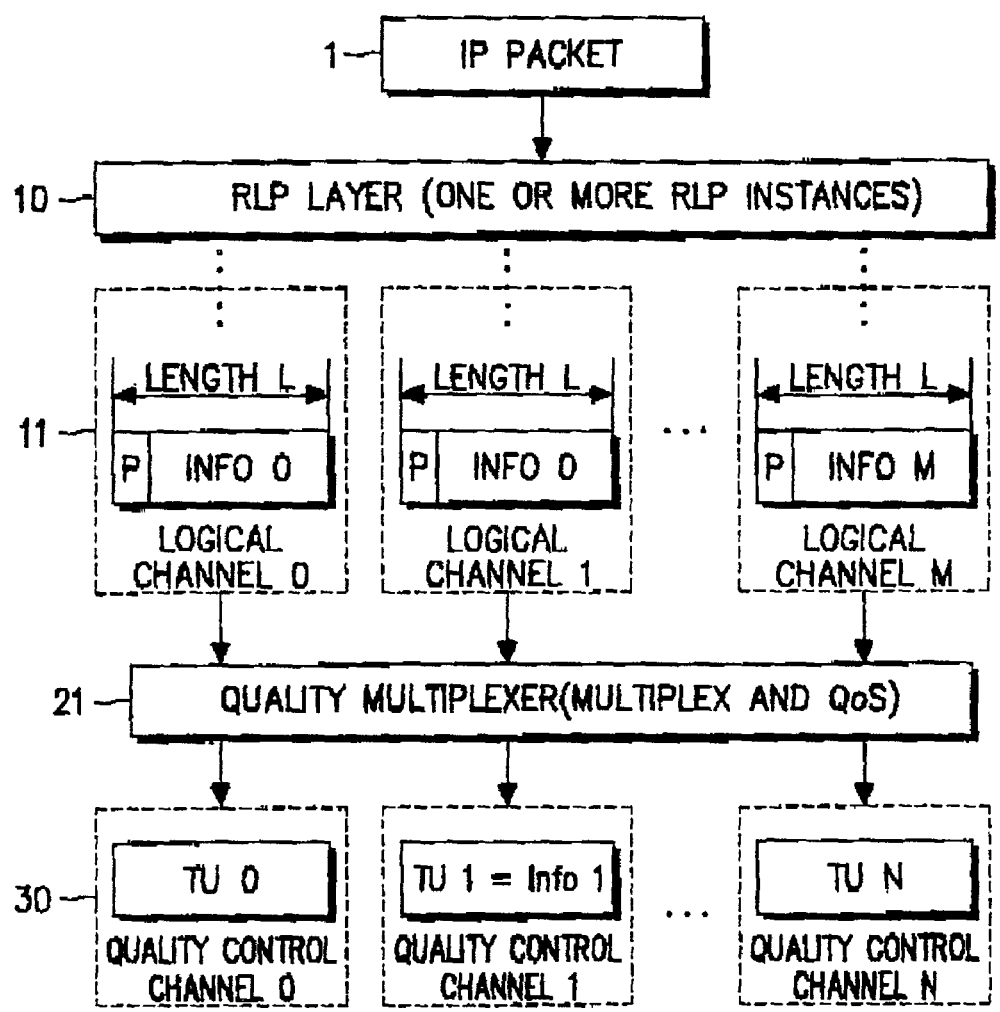
FIG. 6 is a block diagram illustrating a data flow when priority is involved in multiplexing shown in FIG. 4.

FIG. 6 illustrates a data flow when priority is involved in multiplexing shown in FIG. 4.

The procedure shown in FIG. 6 is the same as that shown in FIG. 4 except for datagrams Info 0, Info 1, . . . , Info M. The datagram on each logical channel has a priority field. The priority field structure and determination of priority levels have been described before referring to FIG. 5.

The following description is made on the case where datagrams of the same size Info 0, Info 1 and Info 2 are generated via three logical channels and a single QCCH 30 is set up. If the datagrams Info 0, Info 1 and Info 2 have the highest priority, the middle priority, and the lowest priority, respectively, the quality MUX 21 transmits the datagrams on the QCCH 30 in the order of Info 0, Info 1, and Info 2 according to their priority levels.

On the other hand, if two or more QCCHs 30 are set up, the quality MUX 21 transmits the datagrams appropriately. When datagrams with the same priority level are generated, the quality MUX 21 first transmits'the earlier input datagram according to the time division principle. However, if the datagrams are generated concurrently, the logical channels are mapped to the QCCHs 30 by scheduling such as a round robin method in the quality MUX 21.

Figure 7:
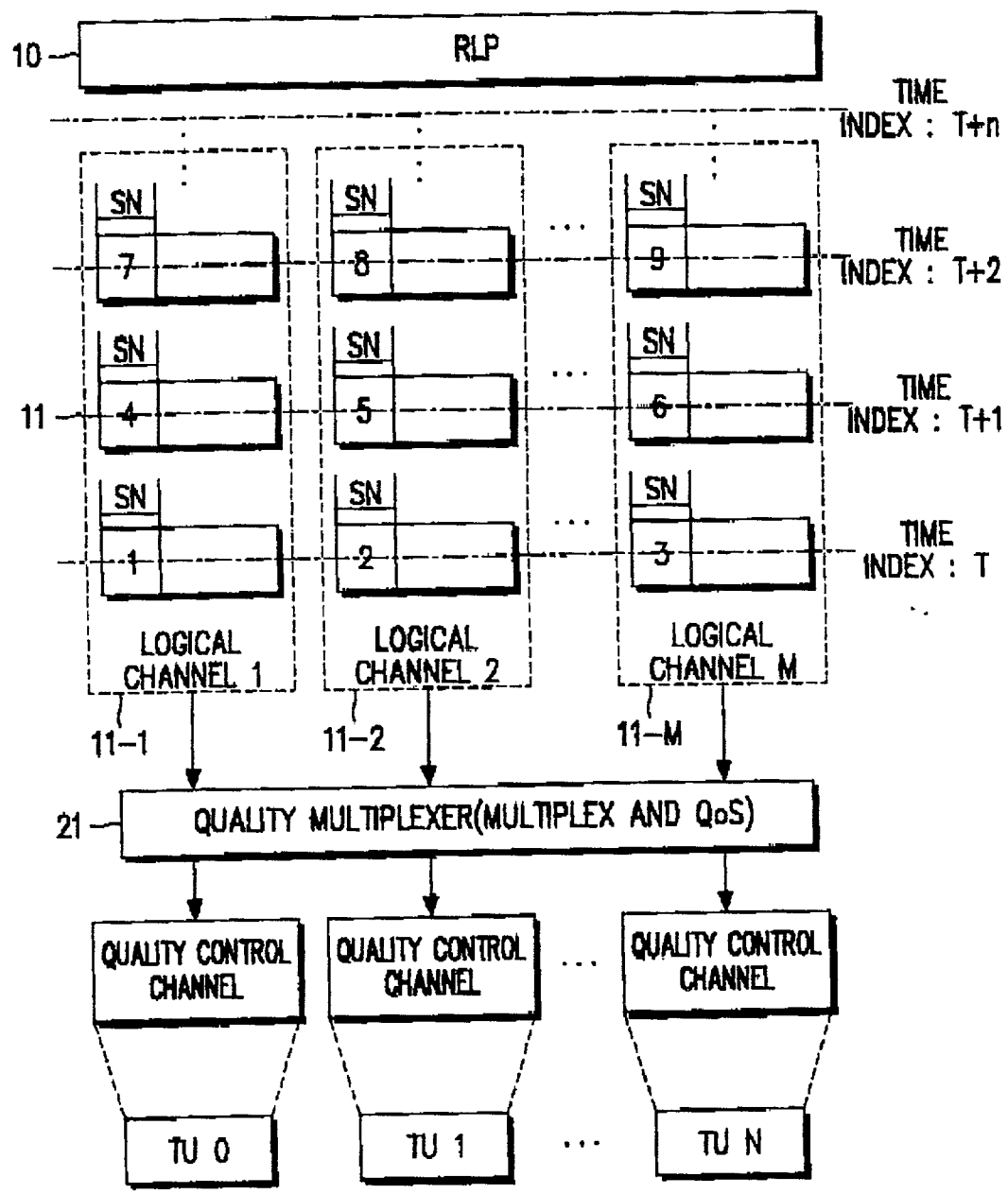
FIG. 7 is a block diagram illustrating assignment of sequence numbers in the RLP layer when one RLP instance takes charge of a plurality of logical channels according to an embodiment of the present invention.

FIG. 7 is a block diagram illustrating a data flow from the RLP layer 10 to the MUX layer 20 when one RLP instance is used.

Referring to FIG. 7, M logical channels (e.g., M=3 here) are generated from a single RLP instance. Datagrams on the three logical channels are labeled with successive sequence numbers. The datagrams with the same time index are labeled with successive sequence numbers. For example, logical channel #1 is assigned to sequence number (SN) 1, logical channel #2 to SN2, and logical channel #M to SN 3, for time index t. In the same manner, logical channel #1 is assigned to SN 4, logical channel #2 to SN 5, and logical channel #M to SN 6, for time index t+1. For time index t+2, logical channel #1 is assigned to SN 7, logical channel #2 to SN 8, and logical channel #M to SN 9.

While sequence numbers are serially given for time indexes t to t+n, they can be given independently. Also, the number of logical channels is not limited to 3 as in the embodiment of the present invention.

In accordance with the above embodiment, the single RLP instance assigns and manages a plurality of logical channels 11 and sequence numbers are given to the logical channels 11 according to the predetermined rule.

Figure 8:
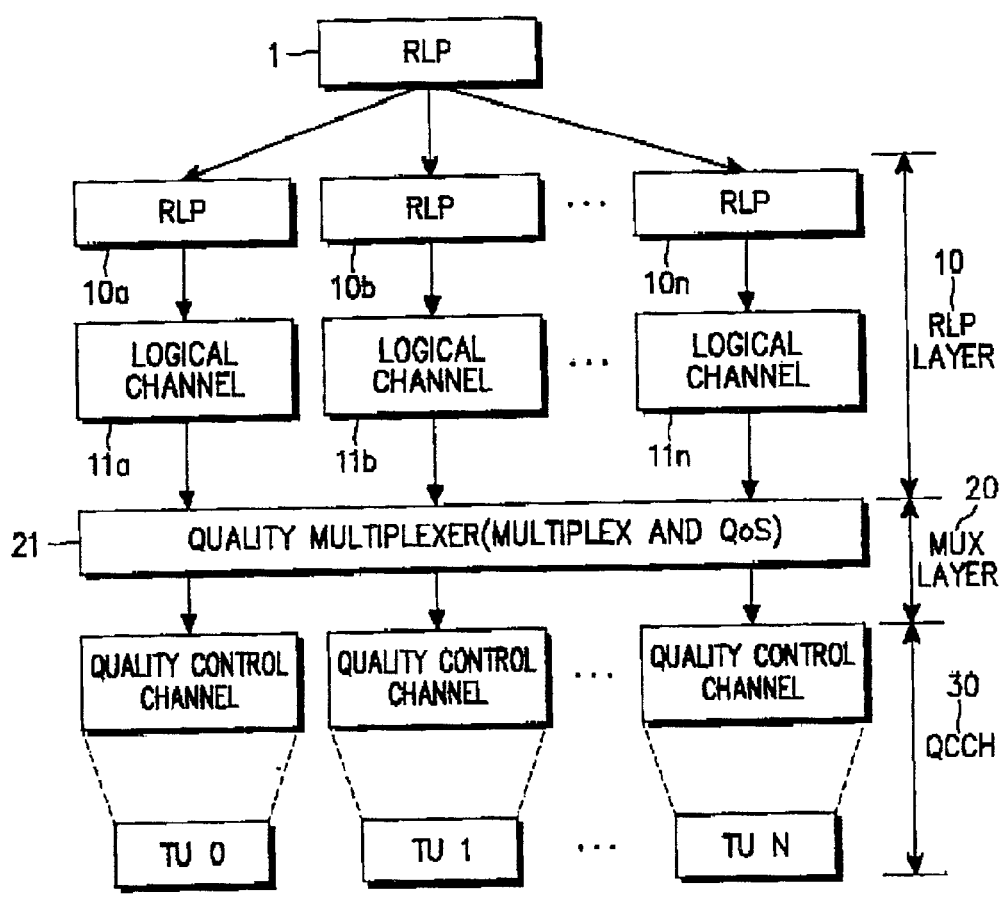
FIG. 8 is a block diagram illustrating data processing in the RLP layer and the MUX layer when one RLP instance takes charge of one logical channel according to an embodiment of the present invention.

FIG. 8 is a block diagram illustrating a data flow from the RLP layer 10 to the MUX layer 20 when a plurality of RLP instances are used.

In FIG. 8, the IP packet 1 is input to a plurality of independent RLP instances 10a to 10n in the case where the RLP instances provide different services or cannot be bound into one RLP instance according to different data rates or the characteristics of application services. As many RLP instances as logical channels are generated. The RLP instances 10a to 10n divide the IP packet 1 into datagrams of a suitable size. As stated before, each datagram is fixed or variable in length.

As shown in FIG. 8, each RLP instance controls one logical channel. The number of logical channels is determined according to the QoSs provided by the IP packet 1 or the characteristics of application services, and data rates, as mentioned before. The datagrams are given to sequence numbers to allow the receiver to reassemble the datagrams in the order of being generated from higher application services or re-receive data containing errors. Hence, the assignment and management of sequence numbers is a significant function to the RLP layer 10. When each RLP instance controls one logical channel as shown in FIG. 8, which implies that the datagrams transmitted on the logical channels 11 are generated from the plurality of RLP instances, the datagrams can be labeled with sequence numbers in a different mechanism. Therefore, the datagrams on the logical channels have independent sequence numbers, which will be described later with reference to FIG. 9.

The quality MUX 21 maps the datagrams received on the logical channels 11a to 11n to TUs for QCCHs 30-1 to 30-n. The TUs are added with CRCs and converted to radio packet data in the lower layer prior to transmission to the receiver.

Figure 9:
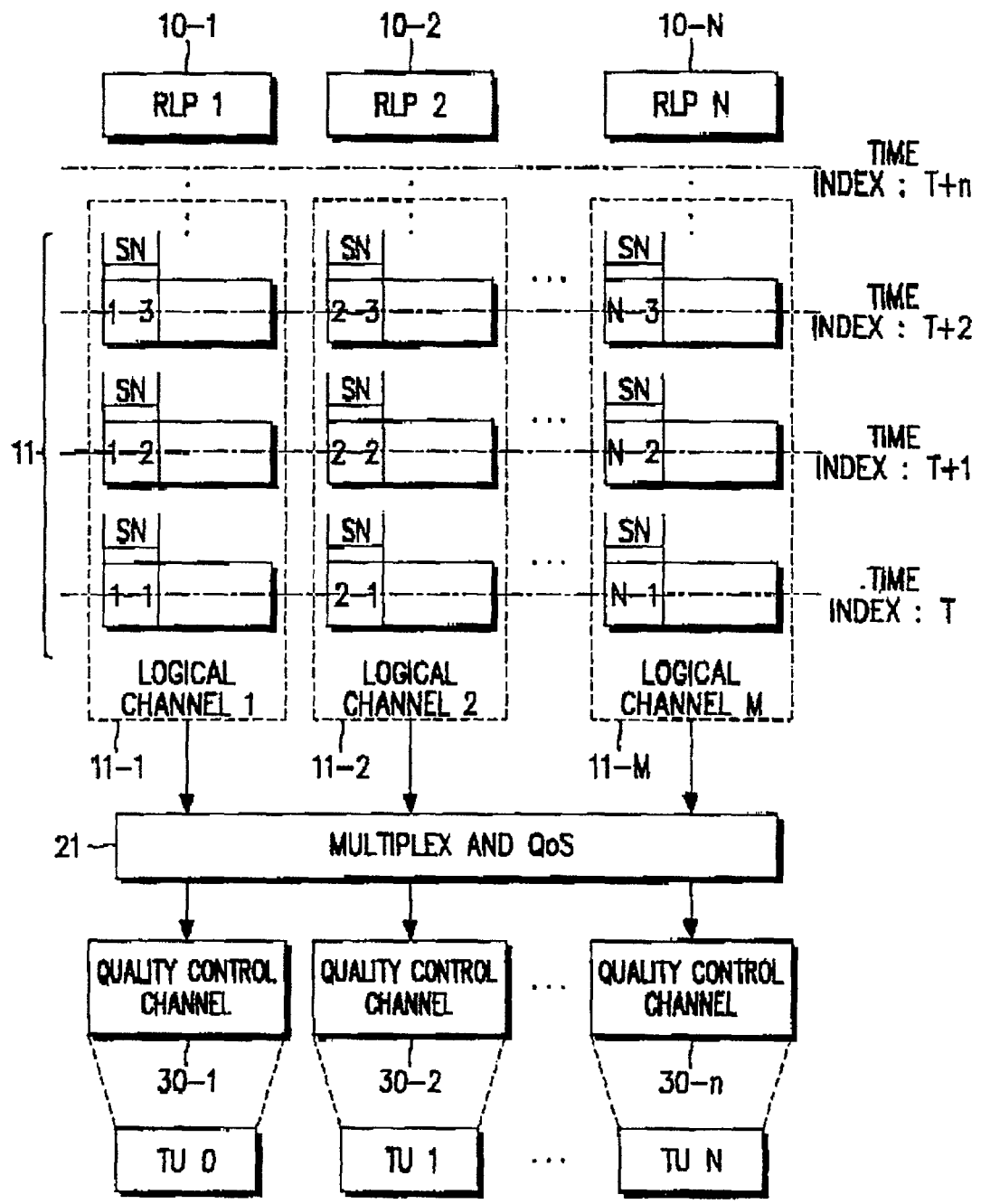
FIG. 9 is a block diagram illustrating assignment of sequence numbers transfer of data when one RLP instance takes charge of one logical channel according to the FIG. 8.

FIG. 9 is a block diagram illustrating assignment of sequence numbers when one RLP controls one logical channel.

Referring to FIG. 9, it is assumed that three logical channels exist. Datagrams transmitted on logical channels must be given to independent sequence numbers according to RLPs. For the same time index, for example, time t, datagrams have the same sequence numbers. For time t+1, datagrams have sequence numbers following those sequence numbers of the previous datagrams at time t. Since datagrams have the same sequence numbers for the same time index, it is necessary to identify the RLPs. Thus each datagram should have an RLP ID. As shown in FIG. 9, the datagrams are labeled with RLP Ids as well as sequence numbers.

More specifically, for time index t, logical channel #1 is labeled with the first sequence number for RLP #1, SN 1-1, logical channel #2 with the first sequence number for RLP #2, 2-1, and logical channel #M with the first sequence number for RLP #N, N-1. For time index t+1, logical channel #1 is labeled with the second sequence number for RLP #1, SN 1-2, logical channel #2 with the second sequence number for RLP #2, 2-2, and logical channel #M with the second sequence number for RLP #N, N-2. For the subsequent time indexes, sequence numbers are assigned in the same manner.

While sequence numbers are serially assigned from time index t to t+n in the above description, they can be independently given. Also, the number of logical channels is not limited to 3. The afore-described RLP ID is unique to a TU transmitted via the MUX layer 20 and can be used as the ID of a QCCH.

If control information and data information are transmitted on different logical channels, an internal primitive is required between the RLP instances from which they are generated since the control information is a control signal related with the data information. The internal primitive must exist when control information and data information occur concurrently and internal communication must be provided between the RLP instances. That is, the RLP instance that generates the data information must transmit it to the RLP instance that generates the control information by means of the internal primitive. When the control information and the data information are supposed to be transmitted together, synchronization information should also be transmitted to synchronize between the transmission timings of the data information and the control information.

As described above, one RLP instance can control a plurality of logical channels or only one logical channel. Many combinations can be made with these two schemes. For example, one RLP instance can control two or more logical channels or one logical channel between intermedias or between intramedias.

Figure 10:
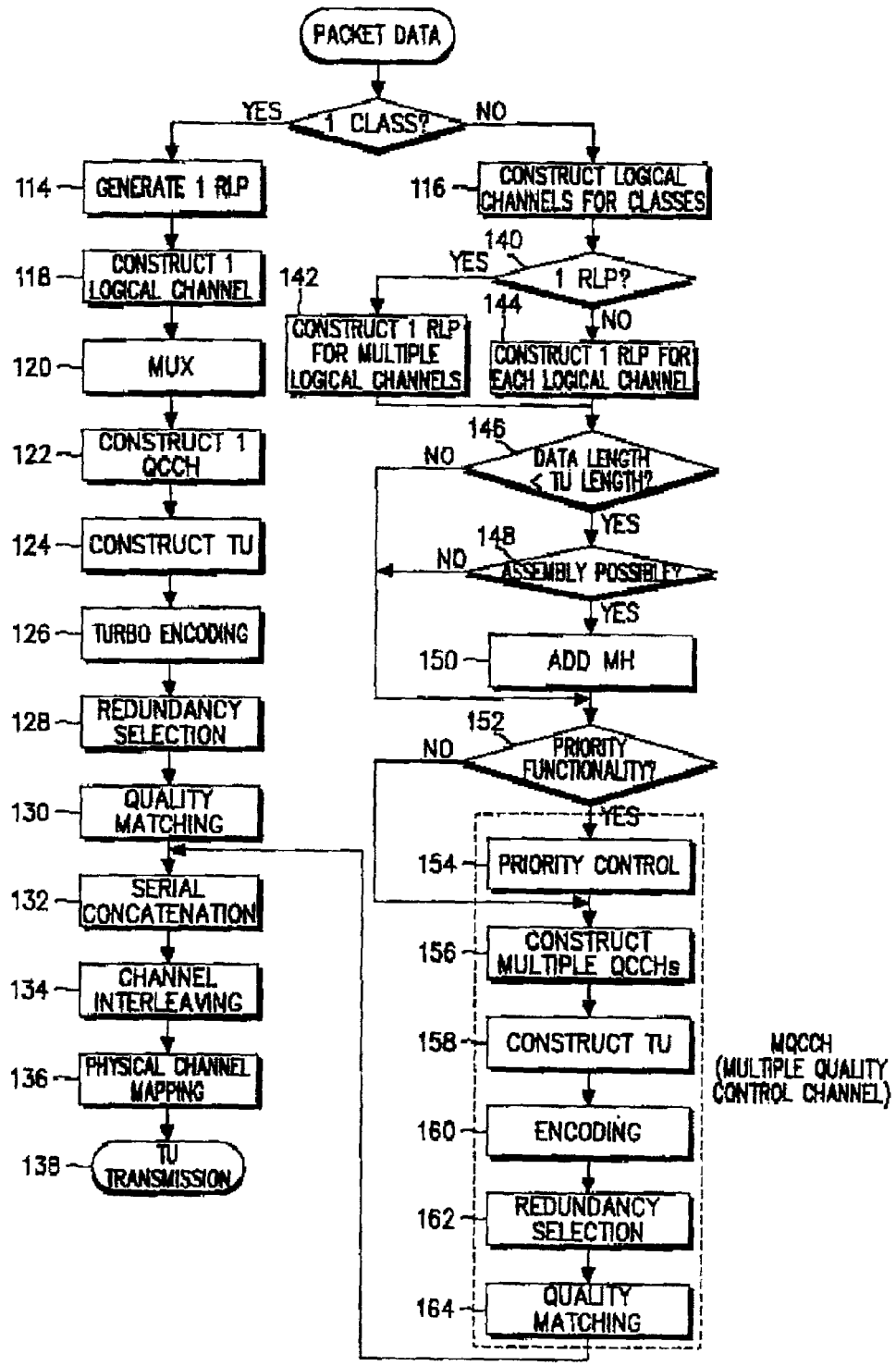
FIG. 10 is a flowchart illustrating a control operation for transmission of packet data in connection with FIGS. 1 to 9 according to an embodiment of the present invention.

FIG. 10 is a flowchart illustrating a control operation for transmitting packet data in connection with FIGS. 1 to 9.

Upon receipt of the IP packet shown in FIGS. 3 to 6 in step 110, the RLP layer 10 determines whether the IP packet 1 has one service class, that is, classified the IP packet 1 in step 112. The IP packet 1 can be classified as intramedia or intermedia. This data classification is based on the QoS of transmission data from the higher layer. If the IP packet 1 has one class, the procedure goes to step 114 and if it has two or more classes, the procedure goes to step 116.

The RLP layer 10 generates one RLP instance for the one-class IP packet in step 114 and constitutes one logical channel to be controlled by the RLP instance in step 118. In step 120, the MUX layer 20 multiplexes a datagram on the logical channel according to the data rate as described before referring to FIG. 1.

The MUX layer 20 constructs a QCCH on which to transmit the datagram in step 122. The datagram generated from the single RLP instance and transmitted on the logical channel is mapped to the one QCCH. Then, the MUX layer 20 generates a TU by adding a CRC to the datagram and transmits the TU on the QCCH to the MQC 40 in step 124. The turbo encoder 41 of the MQC 40 channel-encodes the TU in step 126 and the redundancy selector 42 provides redundancy to the encoded TU in step 128. During the redundancy selection, the redundancy selector 42 selects a redundancy matrix for retransmission, different from that for initial transmission. When an HARQ transmission protocol is used, the redundancy selector 42 uses it to select a complementary code. The QM 43 performs quality matching to the TU by puncturing and repetition in step 130. In steps 132 to 138, the data output from the QM 43 is subject to serial concatenation in the serial concatenator 50 and channel interleaving in the channel interleaver 60, is mapped to a physical channel, and then transmitted.

Meanwhile, the RLP layer 10 constructs as many logical channels as the classes of the IP packet in step 116. If one RLP instance is assigned to each logical channel in step 140, the procedure goes to step 142 and if one RLP instance controls a plurality of logical channels in step 140, the procedure goes to step 144. After the RLP instances are generated in step 142 or 144, the length of the datagram transmitted on each logical channel is measured in step 146. The datagram length is less than or equal to a TU length for a QCCH. If the datagram is less than the TU in step 146, the quality MUX 21 determines whether the datagram is to be assembled with that on another logical channel in step 148. If multiplexing is needed, the procedure goes to step 150 and otherwise, it goes to step 152. If the difference between the class levels of the datagrams to be multiplexed is too wide, they are not assembled. This is checked based on the QoSs of the datagrams in the MUX layer 20. If the datagram length is equal to the TU length in step 146 or if datagram assembly is impossible in step 148, step 152 is performed. When it is possible to assemble two or more datagrams in step 148, headers are added to the datagrams in step 150. If two diagrams are assembled, two headers are inserted. The header information contains information about the lengths of the datagrams assembled.

In step 152, the quality MUX 21 determines whether priority should be considered to construct QCCHs. If priority should be involved, the procedure goes to step 154, and otherwise, it goes to step 156. In step 154, the quality MUX 21 checks the priority levels of the datagrams. Then, the quality MUX 21 sets up one or two QCCHs in step 156, and then in step 158 constructs TUs to be transmitted on the QCCH(s) in the same manner as in step 124. Steps 160 and 162 are also performed in the same manner as in steps 126 and 128. In step 164, quality matching is performed on the different QCCHs using fixed or dynamic QM values. While performed in the same manner as in step 130, step 164 supports different quality matching between the QCCHs. Then, steps 132 to 138 are performed. Steps 154 to 164 occur in the MQC 40.

Figure 11:
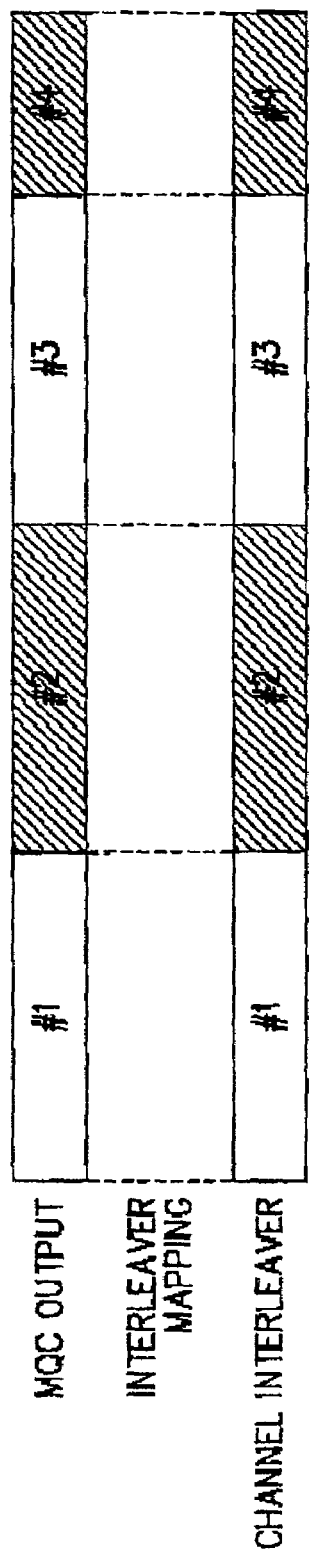
FIG. 11 is a view referred to for describing sequential storage of symbol blocks for respective TUs according to an embodiment of the present invention.

Since a different weight is applied to each QCCH according to its QM value, TU blocks of the same size are formed into symbol blocks of different sizes in the present invention. The symbol blocks are formed in a descending order of high quality QCCHs. FIG. 11 illustrates sequential storage of symbol blocks for respective TUs according to the present invention. MQC outputs are sequentially input to the channel interleaver without changing the input order as shown in FIG. 11, so that the receiver can divide deinterleaver output symbols into blocks of a size based on QM1 and transmit the blocks on QCCHs for decoding.

For example, if each TU of a PLP forms a code symbol at a rate of 1.2/1.0/0.8 according to the weight value of each QM block, the sizes of the output blocks of the QCCHs are different. By assembling higher QCCH outputs, the channel interleaver input is formed. The receiver recovers the QM block output symbols for QCCHs by splitting the channel deinterleaver output at the rates based on the weights disclosed in QM1 in the reception order, and then forms TU blocks by decoding the symbol block of a corresponding QCCH.

Assembling the output symbols of QM blocks to the channel interleaver input has been described above. Since time diversity is offered by interleaving the overall QM blocks in the present invention, there is no need for using a redundant function in assembling the output blocks.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A protocol implementing device in a mobile communication system, comprising:
    an RLP (Radio Link Protocol) layer for receiving data with different qualities of service (QoSs) and dividing the data into datagrams according to the QoSs;
    a MUX (Multiplexing) layer for comparing the length of the datagrams with the length of a transport unit (TU), multiplexing the datagrams received from the RLP layer based on the determination and outputting the multiplexed data in a TU; and
    a QCCH (Quality Control Channel) for receiving the multiplexed TU data and outputting TU blocks with the QoSs by puncturing and repeating information added according to the QoSs for the multiplexed TU.

2. The protocol implementing device of claim 1, further comprising an MQC (Multiple Quality Controller) for performing encoding, redundancy selection, and quality matching on the TU blocks according to the QoSs.

3. The protocol implementing device of claim 2, wherein the MQC comprises:
    an encoder for encoding the TU blocks;
    a redundancy selector for providing identical or different redundancy to the coded data depending on whether initial transmission or retransmission is performed; and
    a quality matcher (QM) for performing quality matching on the redundancy-added data according to the QoSs of the data.

4. The protocol implementing device of claim 3, wherein the encoder is a turbo encoder.

5. The protocol implementing device of claim 1, wherein the RLP layer transmits the datagrams of a variable size to the MUX layer through the logical channels.

6. The protocol implementing device of claim 1, wherein the RLP layer divides the data into the datagrams depending on the size of the logical channels according to source data rates.

7. The protocol implementing device of claim 5, wherein the RLP layer adds a priority header to each datagram transmitted on a logical channel according to the QoS of each datagram.

8. The protocol implementing device of claim 1, wherein if two or more datagrams require the same QoS and one QCCH can accommodate two or more datagrams, the MUX layer multiplexes the datagrams into the one QCCH.

9. The protocol implementing device of claim 8, wherein if the QCCH transmits two or more datagrams, the MUX layer adds multiplexing header (MH) information to each datagram and transmits the MH-added datagrams on the QCCH.

10. The protocol implementing device of claim 1, wherein the RLP layer generates at least one RLP instance according to the types of the data and the number of logical channels and outputs the datagrams on the logical channels.

11. The protocol implementing device of claim 10, wherein the RLP instance outputs the datagrams on one logical channel.

12. The protocol implementing device of claim 11, wherein the RLP instance adds an RLP ID (Radio Link Protocol Identification) and sequence number to each of the datagrams.

13. The protocol implementing device of claim 10, wherein the RLP instance generates datagrams according to source data and outputs the datagrams on at least two logical channels.

14. The protocol implementing device of claim 13, wherein the RLP instance adds sequence number to each datagram transmitted on the logical channels and the sequence number is sequentially assigned according to the priority levels of the logical channels which exist at the same time point.

15. A protocol implementing method in a mobile communication system, comprising:
 receiving data with different qualities of service (QoSs) and dividing the data into datagrams according to the QoSs in an RLP (Radio Link Protocol) layer;
 comparing in a multiplexing (MUX) layer the length of a datagram with the length of a transport unit (TU);
 multiplexing the datagrams received from the RLP layer based on the comparison and outputting the multiplexed data in a TU in the MUX Multiplexing layer; and
 receiving the multiplexed TU data and outputting TU blocks with the QoSs by puncturing and repeating information added according to the QoSs for the multiplexed TU in a QCCH (Quality Control Channel).

16. The method of claim 15, wherein the quality matching step comprises the steps of:
 encoding the TU data;
 providing redundancy to the coded data according to a data rate; and
 performing quality matching on the redundant data according to the QoS of the data.

17. The method of claim 16, wherein the redundancy is provided differently for initial transmission and retransmission.

18. The method of claim 16, wherein turbo encoding is used in the encoding step.

19. The method as claimed in claim 15, the method comprising the steps of:
 (1) constructing as many logical channels as service classes and generating as many RLP instances as required, if the transmission packet has at least two service classes;
 (2) checking whether datagrams processed by the RLP instances can be assembled if the datagrams are shorter than a TU length;
 (3) adding multiplexing headers (MHs) to the datagrams if the assemble is possible and constructing as many QCCHs as required;
 (4) transmitting the TU data on the QCCHs according to the priority levels of the TU data; and
 (5) performing quality matching on the TU data.

20. The method of claim 19, further comprising the step of constructing QCCHs after step (5) and returning to step (4), if the datagrams processed by the RLP instances are longer than the TU length or datagram assembly is impossible.

21. The method of claim 19, wherein step (5) comprises the steps of:
 encoding the TU data;
 providing redundancy to the coded TU data according to a data rate; and
 performing quality matching on the redundant data according to the QoS of the data.

22. The method of claim 21, wherein the redundancy is provided differently for initial transmission and retransmission.

23. The method of claim 19, wherein turbo encoding is used in the encoding step.

* * * * *